(12) United States Patent
Lana et al.

(10) Patent No.: US 9,810,075 B2
(45) Date of Patent: Nov. 7, 2017

(54) FACETED TURBINE BLADE DAMPER-SEAL

(71) Applicant: United Technologies Corporation, Hartford, CT (US)

(72) Inventors: Kyle C. Lana, Portland, CT (US); John E. Paul, Portland, CT (US)

(73) Assignee: United Technologies Corporation, Farmington, CT (US)

( * ) Notice: Subject to any disclaimer, the term of this patent is extended or adjusted under 35 U.S.C. 154(b) by 291 days.

(21) Appl. No.: 14/663,752

(22) Filed: Mar. 20, 2015

(65) Prior Publication Data

US 2016/0273367 A1   Sep. 22, 2016

(51) Int. Cl.

| F01D 5/26 | (2006.01) |
|---|---|
| F01D 5/14 | (2006.01) |
| F01D 5/30 | (2006.01) |
| F01D 11/00 | (2006.01) |
| F01D 5/10 | (2006.01) |
| F01D 25/06 | (2006.01) |

(52) U.S. Cl.
CPC .................. *F01D 5/26* (2013.01); *F01D 5/10* (2013.01); *F01D 5/147* (2013.01); *F01D 5/3007* (2013.01); *F01D 11/006* (2013.01); *F01D 11/008* (2013.01); *F01D 25/06* (2013.01); *F05D 2220/32* (2013.01); *F05D 2240/24* (2013.01); *F05D 2240/55* (2013.01); *F05D 2260/96* (2013.01); *F05D 2300/10* (2013.01); *Y02T 50/673* (2013.01)

(58) Field of Classification Search
CPC ... F01D 5/26; F01D 5/10; F01D 5/147; F01D 5/3007; F01D 5/22; F01D 5/00; F01D 11/006; F01D 25/06; F05D 2220/32; F05D 2240/24; F05D 2240/55; F05D 2260/96; F05D 2300/10
See application file for complete search history.

(56) References Cited

U.S. PATENT DOCUMENTS

| 4,872,812 A | 10/1989 | Hendley et al. |
|---|---|---|
| 4,936,749 A | 6/1990 | Arrao et al. |
| 5,228,835 A | 7/1993 | Chlus |
| 5,281,097 A | 1/1994 | Wilson et al. |
| 5,460,489 A | 10/1995 | Benjamin et al. |
| 5,478,207 A | 12/1995 | Stec |
| 5,573,375 A | 11/1996 | Barcza |
| 5,785,499 A | 7/1998 | Houston et al. |
| 5,803,710 A | 9/1998 | Dietrich et al. |

(Continued)

FOREIGN PATENT DOCUMENTS

| DE | 10346384 A1 | 4/2005 |
|---|---|---|
| EP | 0437977 A1 | 7/1991 |

(Continued)

OTHER PUBLICATIONS

Extended European Search Report, for European Patent Application No. 16161381.5, dated Oct. 14, 2016, 7 pages.

*Primary Examiner* — Dwayne J White
*Assistant Examiner* — Aaron R Eastman
(74) *Attorney, Agent, or Firm* — Kinney & Lange, P.A.

(57) ABSTRACT

A damper seal received in a cavity of a turbine blade includes a central body with two ends and a two sides. A portion extends from each end, one side has a faceted edge, and a projection extends from the other side to receive a lug of the turbine blade to align the damper seal relative to the turbine blade.

17 Claims, 15 Drawing Sheets

(56) References Cited

U.S. PATENT DOCUMENTS

| | | |
|---|---|---|
| 5,827,047 A | 10/1998 | Gonsor et al. |
| 5,924,699 A | 7/1999 | Airey et al. |
| 6,171,058 B1 | 1/2001 | Stec |
| 6,273,683 B1 | 8/2001 | Zagar et al. |
| 6,315,298 B1 * | 11/2001 | Kildea .................. F01D 11/006 277/433 |
| 6,343,912 B1 | 2/2002 | Manteiga et al. |
| 6,932,575 B2 | 8/2005 | Surace et al. |
| 7,021,898 B2 | 4/2006 | Elliott et al. |
| 7,121,800 B2 | 10/2006 | Beattie |
| 7,121,802 B2 | 10/2006 | Athans et al. |
| 7,244,101 B2 | 7/2007 | Lee et al. |
| 7,322,797 B2 | 1/2008 | Lee et al. |
| 7,374,400 B2 | 5/2008 | Boswell |
| 8,011,892 B2 | 9/2011 | Ramlogan et al. |
| 8,066,479 B2 | 11/2011 | El-Aini et al. |
| 8,231,352 B2 | 7/2012 | Hunt et al. |
| 8,240,987 B2 | 8/2012 | Spangler et al. |
| 8,322,990 B2 | 12/2012 | Hunt et al. |
| 8,393,869 B2 | 3/2013 | Kim et al. |
| 8,672,626 B2 | 3/2014 | Boy et al. |
| 8,820,754 B2 | 9/2014 | Stewart et al. |
| 2006/0013691 A1 * | 1/2006 | Athans .................. F01D 5/22 416/193 A |
| 2007/0158919 A1 * | 7/2007 | Bennett .................. F01D 11/005 277/644 |
| 2009/0136350 A1 | 5/2009 | Whitton |
| 2010/0040479 A1 * | 2/2010 | Spangler ............... F01D 11/006 416/97 R |
| 2012/0057988 A1 | 3/2012 | Stiehler |
| 2012/0121436 A1 | 5/2012 | Borufka et al. |
| 2012/0269650 A1 | 10/2012 | Berche et al. |
| 2012/0328415 A1 | 12/2012 | Blanchard et al. |
| 2013/0052032 A1 | 2/2013 | Fachat et al. |
| 2013/0101395 A1 | 4/2013 | Miller et al. |
| 2013/0108467 A1 | 5/2013 | Berche et al. |
| 2013/0195665 A1 * | 8/2013 | Snyder .................... F01D 5/22 416/174 |
| 2014/0003950 A1 | 1/2014 | Beattie et al. |
| 2014/0030100 A1 | 1/2014 | Joshi et al. |
| 2014/0112786 A1 | 4/2014 | Donnell et al. |
| 2014/0119917 A1 | 5/2014 | Tarczy et al. |
| 2014/0271205 A1 | 9/2014 | Marasco et al. |
| 2014/0271206 A1 | 9/2014 | Marasco et al. |

FOREIGN PATENT DOCUMENTS

| | | |
|---|---|---|
| EP | 1600606 A1 | 11/2005 |
| EP | 1635037 A2 | 3/2006 |
| WO | 2014159152 A1 | 10/2014 |
| WO | 2014164252 A1 | 10/2014 |

* cited by examiner

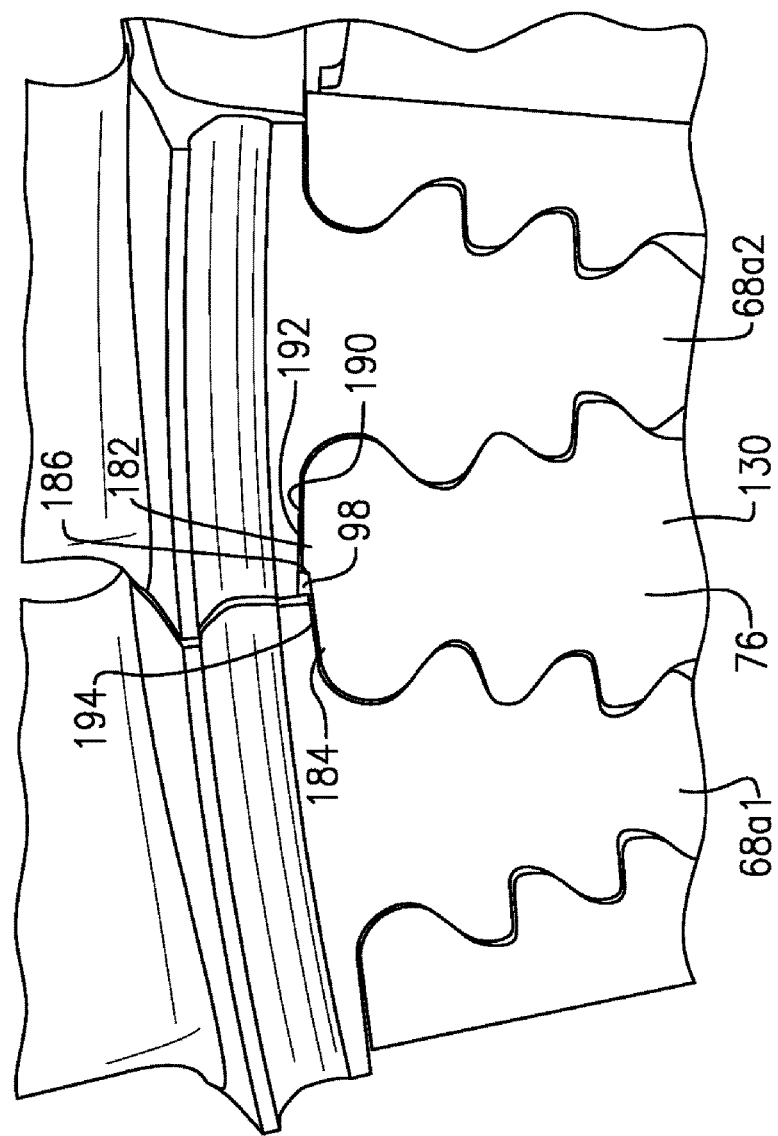

FACETED TURBINE BLADE DAMPER-SEAL

BACKGROUND OF THE INVENTION

A gas turbine engine includes a plurality of turbine blades each received in a slot of a turbine disk. The turbine blades are exposed to aerodynamic forces that can result in vibratory stresses. A damper can be located under platforms of adjacent turbine blades to reduce the vibratory response and provide frictional damping between the turbine blades. The damper slides on an underside of the platforms. The damper is made of a material that is dissimilar from the material of the turbine blades. When the vibratory motions of adjacent turbine blades oppose each other (that is, occur out of phase), the damper slides to absorb the energy of vibration. It is usually a stiff slug of metal with rigid features to provide consistent contact with each side of the platform.

Additionally, the turbine blades are exposed to hot gasses. An air cavity between a turbine disk and a gas path of a turbine blade may be pressurized with cooling air to protect the turbine disk from high temperatures. A separate seal is often located near the platform to control the leakage of the cooling air into the hot gasses, improving engine performance and fuel efficiency.

SUMMARY OF THE INVENTION

According to one embodiment of the present invention, a damper seal received in a cavity of a turbine blade includes a central body with two ends and a two sides. A portion extends from each end, one side has a faceted edge, and a projection extends from the other side to receive a lug of the turbine blade to align the damper seal relative to the turbine blade.

BRIEF DESCRIPTION OF THE DRAWINGS

FIG. 14 illustrates a front view of two turbine blades each installed in one of the turbine disk slots of the turbine disk of FIG. 10.

DETAILED DESCRIPTION OF THE PREFERRED EMBODIMENTS

Figure 1:
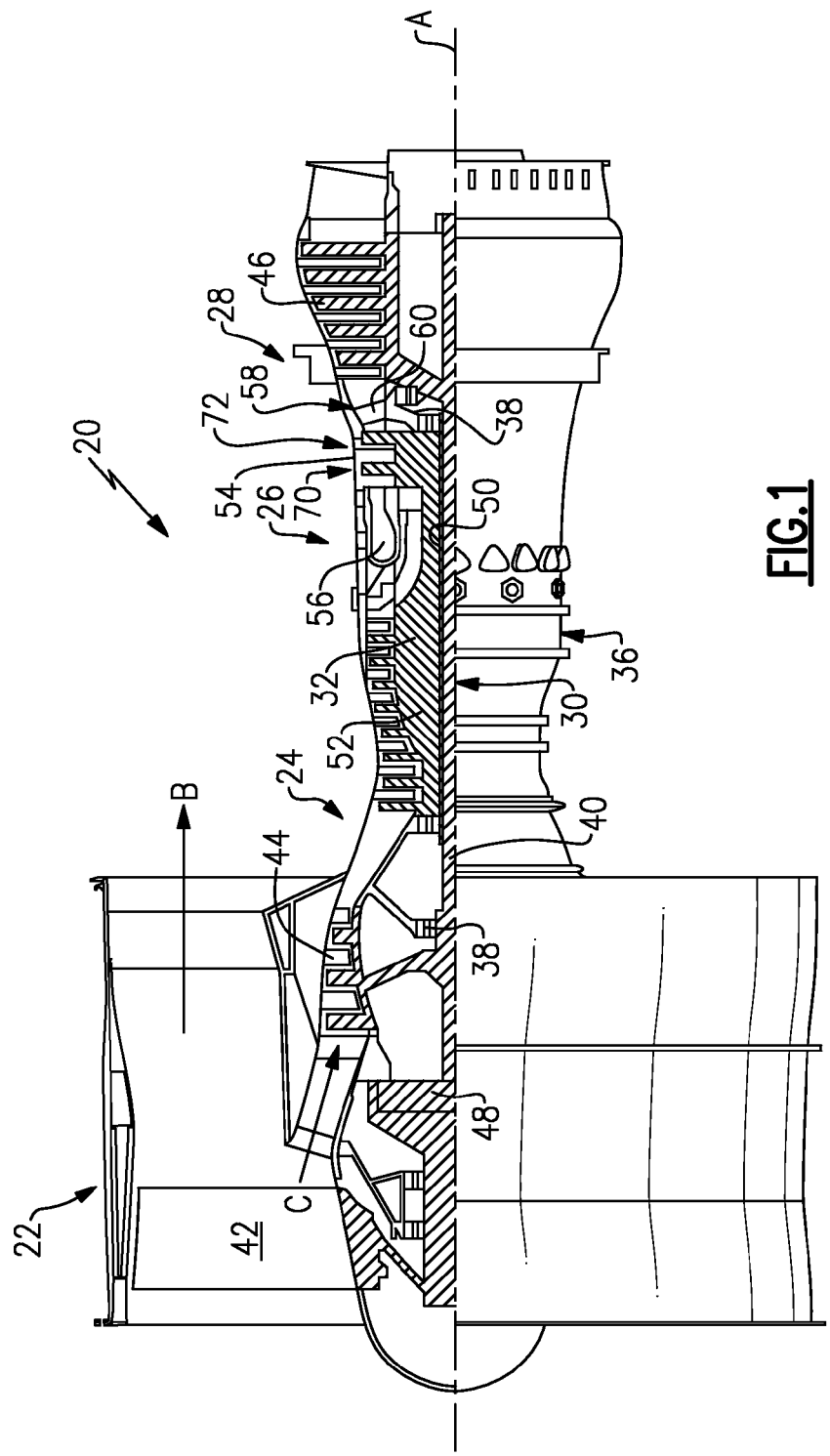
FIG. 1 illustrates a schematic view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54.

Figure 2:
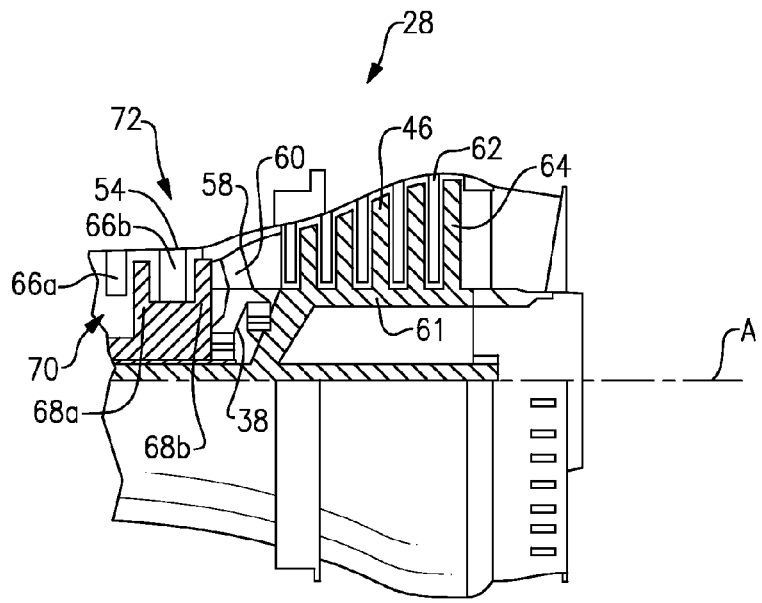
FIG. 2 illustrates a turbine section of FIG. 1.

As shown in FIG. 2, the high pressure turbine 54 includes a first stage 70 and a second stage 72. The first stage 70 includes a static vane 66a and plurality of turbine blades 68a. The second stage 72 includes a static vane 66b and a plurality of turbine blades 68b.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A, which is collinear with their longitudinal axes.

The core airflow C is compressed by the low pressure compressor 44, then the high pressure compressor 52, mixed and burned with fuel in the combustor 56, then expanded over the high pressure turbine 54 and low pressure turbine 46. The mid-turbine frame 58 includes airfoils 60 which are in the core airflow path. The turbines 46, 54 rotationally drive the respective low speed spool 30 and high speed spool 32 in response to the expansion.

The engine 20 is in one example a high-bypass geared aircraft engine. In a further example, the engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

In one disclosed embodiment, the engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (11,000 meters). The flight condition of 0.8 Mach and 35,000 feet (11,000 meters), with the engine at its best fuel consumption, also known as bucket cruise Thrust Specific Fuel Consumption ("TSFC"). TSFC is the industry standard parameter of lbm of fuel being burned divided by lbf of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45.

"Low corrected fan tip speed" is the actual fan tip speed in feet per second divided by an industry standard temperature correction of [(Tambient deg R)/518.7].sup.0.5]. The "Low corrected fan tip speed" as disclosed herein according to one non-limiting embodiment is less than about 1150 feet per second (351 meters per second).

FIG. 2 illustrates the turbine section 28. The turbine section 28 includes turbine discs 61 that each rotate about the axis A. In the first stage 70 of the high pressure turbine 54, a plurality of turbine blades 68a are mounted on a turbine disk 61. In the second stage 72 of the high pressure turbine 54, a plurality of turbine blades 68b are mounted on another turbine disk 61.

Figure 3:
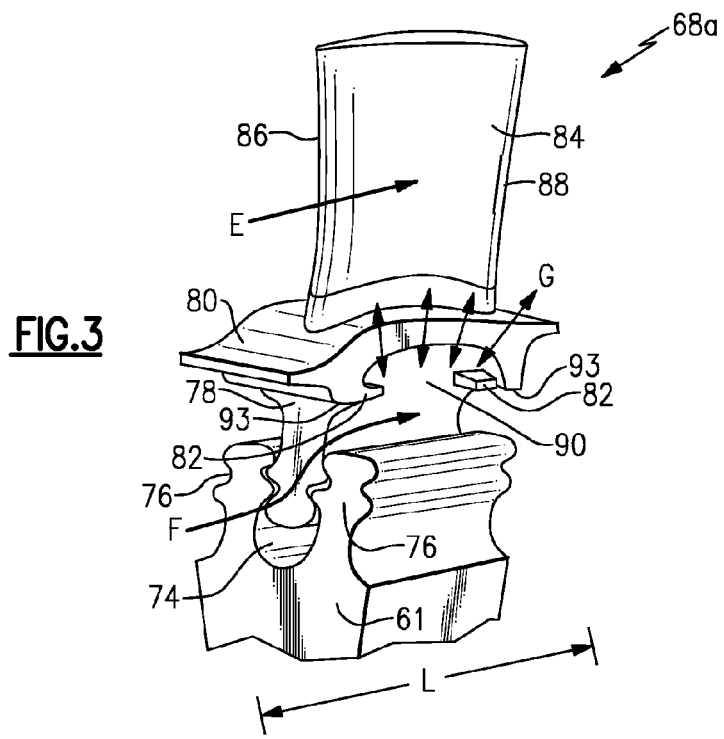
FIG. 3 illustrates an embodiment of a turbine blade and a turbine disk.

FIG. 3 illustrates a perspective view of a turbine blade 68a partially installed in a turbine disk 61. In one example, the turbine blades 68a are made of a nickel alloy. The turbine disk 61 includes a plurality of slots 74 separated by turbine disk lugs 76. The slot may be in the shape of a dovetail, a fir tree shape, or some other configuration. The turbine blade 68a includes a root 78 that is received in one of the plurality of turbine disk slots 74 of the turbine disk 61, a platform 80 including retention shelves 82 and buttresses 93, and an airfoil 84. The platform 80 has a length L. The airfoil 84 has a leading edge 86 and a trailing edge 88. A neck cavity 90 is defined between the platform 80 and the retention shelf 82. A buttress 93 is also located in the neck cavity 90 and under the platform 80 of each turbine blade 68a. The buttress 93 is a support structure that connects the platform 80 to the retention shelf 82.

Hot gasses flow along a hot gas flow path E. The neck cavity 90 between adjacent turbine blades 68a is pressurized with a flow of cooling air F to protect the turbine discs 61 from the hot gasses in the hot gas flow path E.

Figure 4A:
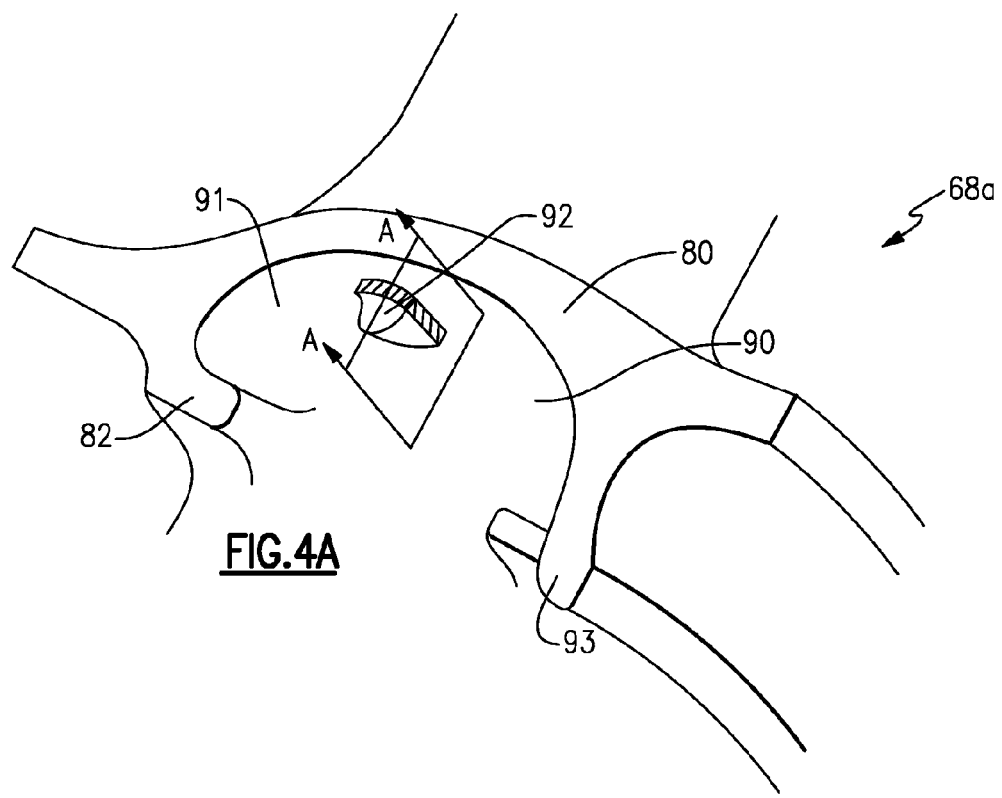
FIG. 4A illustrates a bottom perspective view of the turbine blade of FIG. 3.

FIG. 4A illustrates a lower perspective view of a turbine blade 68a to be located in the first stage 70 of the high pressure turbine 54, for example. The neck cavity 90 includes a retention nub 92 located on a lower surface 91 of the platform 80.

Figure 4B:
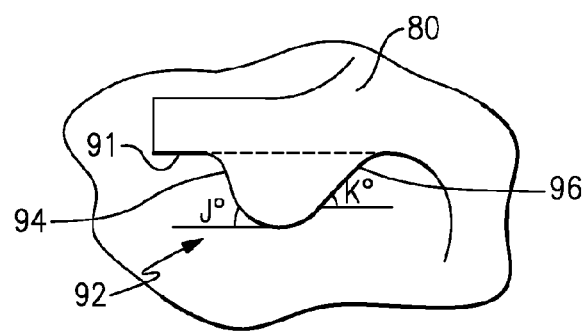
FIG. 4B illustrates a retention nub of the turbine blade the taken along section A-A of FIG. 4A.

FIG. 4B illustrates a cross-sectional view of the retention nub 92 taken along section A-A of FIG. 4A. The retention nub 92 includes a first surface 94 and a second surface 96. An angle J defined between the first surface 94 and a horizontal plane is approximately 30 to 60 degrees. An angle K defined between the second surface 96 and the horizontal plane is approximately 45 to 85 degrees.

Figure 5:
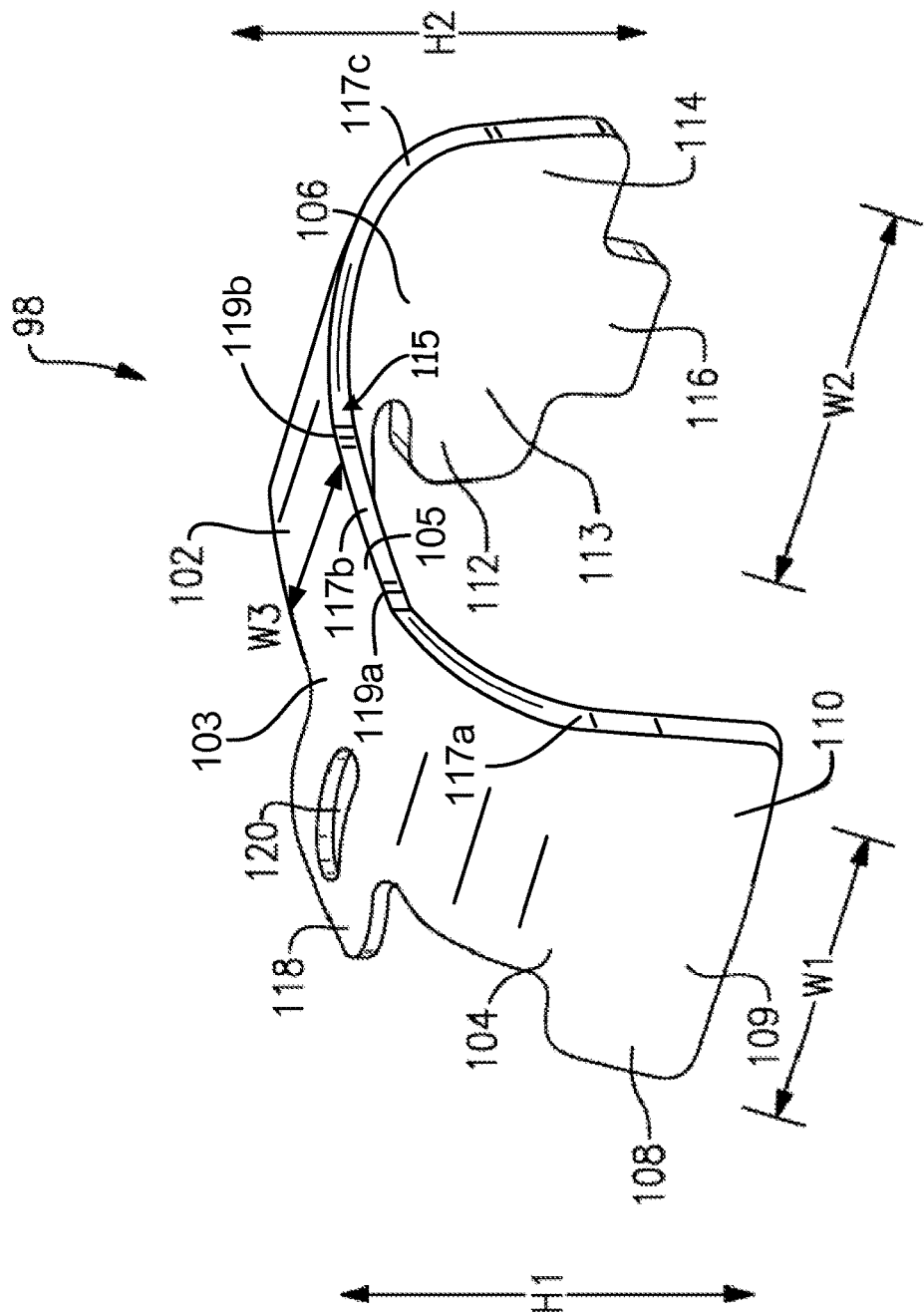
FIG. 5 illustrates an embodiment of a perspective view of a first example damper seal.
Figure 7:
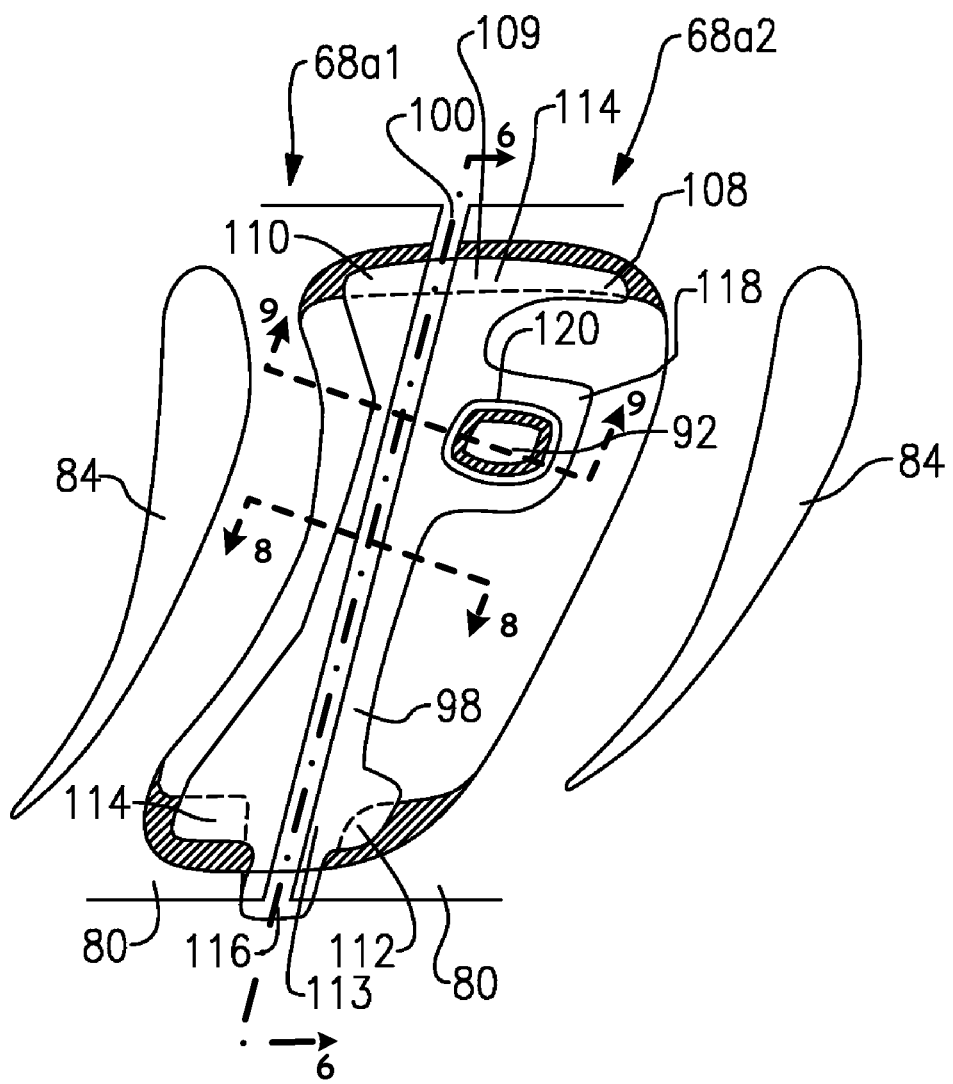
FIG. 7 illustrates a top cross-sectional view of the first example damper seal installed between two adjacent turbine blades.

FIG. 5 illustrates a perspective view of a damper seal 98 that spans a space 100 (as shown in FIG. 7) between platforms 80 of adjacent turbine blades 68a in the first stage 70 of the high pressure turbine 54 to provide both damping and sealing and prevent the leakage of the cooling air F. The damper seal 98 imposes a normal load on the adjacent turbine blades 68a due to centrifugal force. The resulting frictional force created by the normal load produces damping to reduce a vibratory response. The damper seal 98 prevents the cooling air F in the neck cavity 90 from leaking into the hot flow gas path E along arrows G (shown in FIG. 3).

The damper seal 98 is formed from stamped sheet metal. The damper seal 98 can also be formed by direct metal laser sintering. Other manufacturing methods are possible. The damper seal 98 is ductile enough to conform to the lower surface 91 of the platform 80 and provide consistent and complete contact with the turbine blade 68a. In one example, the damper seal 98 is substantially c-shaped. This embodiment of a damper seal 98 includes a slightly curved upper portion 102. A first downwardly curved portion 104 and a second downwardly curved portion 106 extend from opposing end regions of the slightly curved upper portion 102. In one example, relative to the slightly curved upper portion 102 of the damper seal 98, a height H2 of the second downwardly curved portion 106 is longer than a height H1 of the first downwardly curved portion 104.

An end region of the first downwardly curved portion 104 includes a first tab 108 and a second tab 110 that each extend in opposing directions and substantially perpendicularly to the first downwardly curved portion 104. Together, the tabs 108 and 110 define an enlarged section 109 having a width W1 that is greater than a width W3 of the first downwardly curved portion 104 and prevent rocking of the damper seal 98.

An end region of the second downwardly curved portion 106 includes a first tab 112 and a second tab 114 that each extend in opposing directions and substantially perpendicular to the second downwardly curved portion 106. Together, the tabs 112 and 114 define an enlarged section 113 having a width W2 that is greater than the width W3 of the second downwardly curved portion 106 and prevent rocking of the damper seal 98. A third tab 116 extends substantially perpendicularly to the tabs 112 and 114 and also extends in the same general direction as the second downwardly curved portion 106. The third tab 116 is narrower than the enlarged section 113. The third tab 116 provides sealing to the neck cavity 90 and prevents the passage of the cooling air F into the hot gas flow path E. The first downwardly curved portion 104 does not include a corresponding tab because sealing is not necessary in this location due to the flow path of the hot gas E in the first stage 70 of the high pressure turbine 54.

The damper seal 98 also includes additional projection 118 that extends substantially perpendicularly to the slightly curved upper portion 102 from first side region 103. The additional projection 118 is located closer to the tabs 108 and 110 of the first downwardly curved portion 104 of the damper seal 98 than to the tabs 112, 114 and 116 of the second downwardly curved portion 106 of the damper seal 98. The additional projection 118 includes an opening 120 that receives the retention nub 92 (shown in FIG. 6) of the turbine blade 68a when the damper seal 98 is installed, preventing misalignment between the damper seal 98 and the turbine blade 68a. Opposite from the first side region 103 and the additional projection 118 is second side region 105. The second side region 105 includes faceted edge 115. The faceted edge 115 includes face 117a adjacent to face 117b adjacent to face 117c. Each of the faces 117a, 117b and 117c are flat with short curved portions 119a and 119b in between, respectively.

Figure 6:
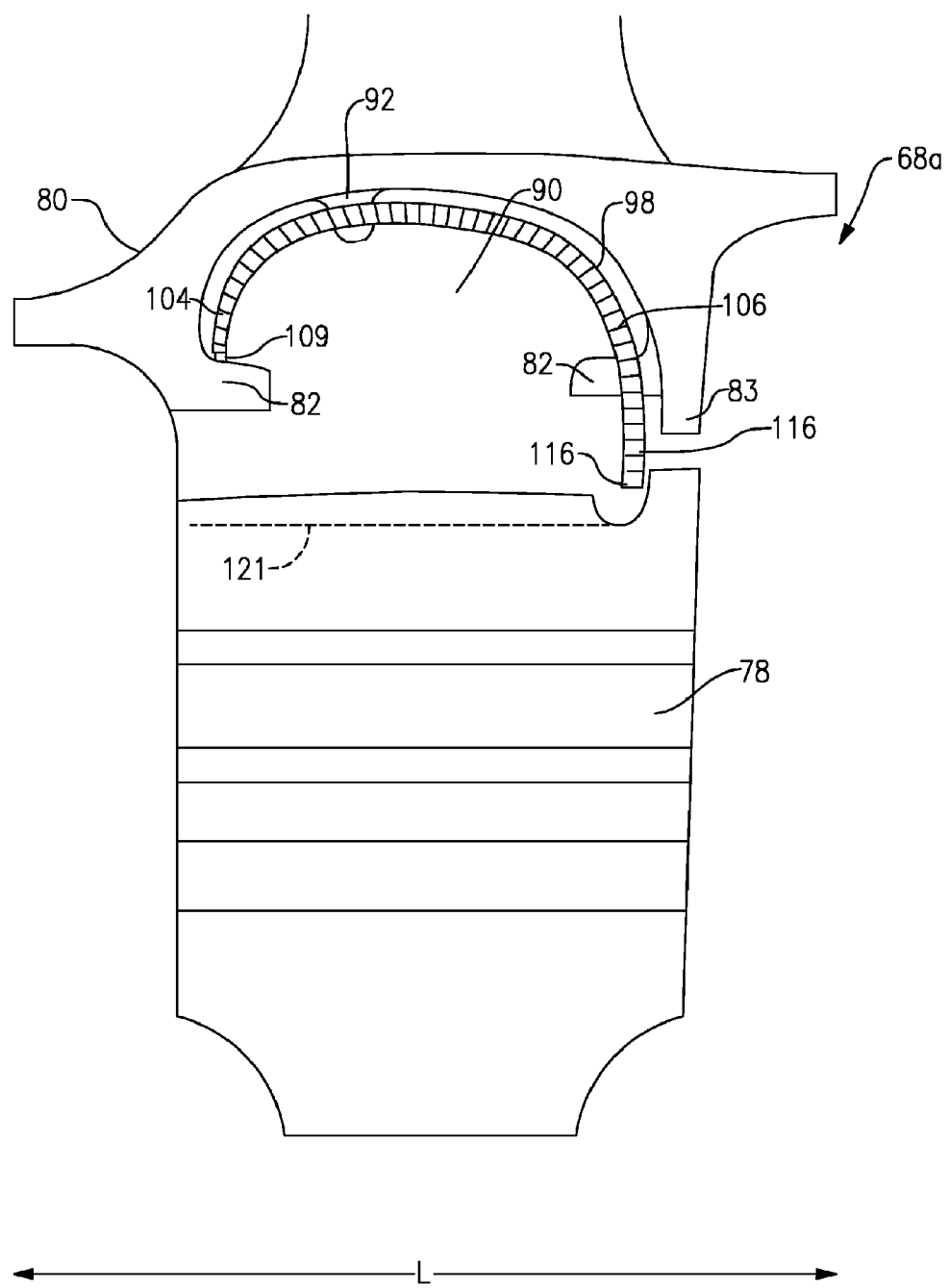
FIG. 6 illustrates a cross-sectional side view along section 6-6 in FIG. 7 of a turbine blade with the first example damper seal installed.

FIG. 6 illustrates a side view of the turbine blade 68a with the damper seal 98 installed in the neck cavity 90. The retention nub 92 of the turbine blade 68a is received in the opening 120 of the additional projection 118 (both shown in FIG. 6) of the damper seal 98. The enlarged section 109 of the first downwardly curved portion 104 rests on one of the retention shelves 82. The retention shelves 82 assist in retaining the damper seal 98 in the neck cavity 90. The damper seal 98 is free to move and slide to dampen vibrations and provide frictional damping, but is restrained by both the retention shelves 82 and the engagement of the retention nub 92 in the opening 120 of damper seal 98.

Figure 8:
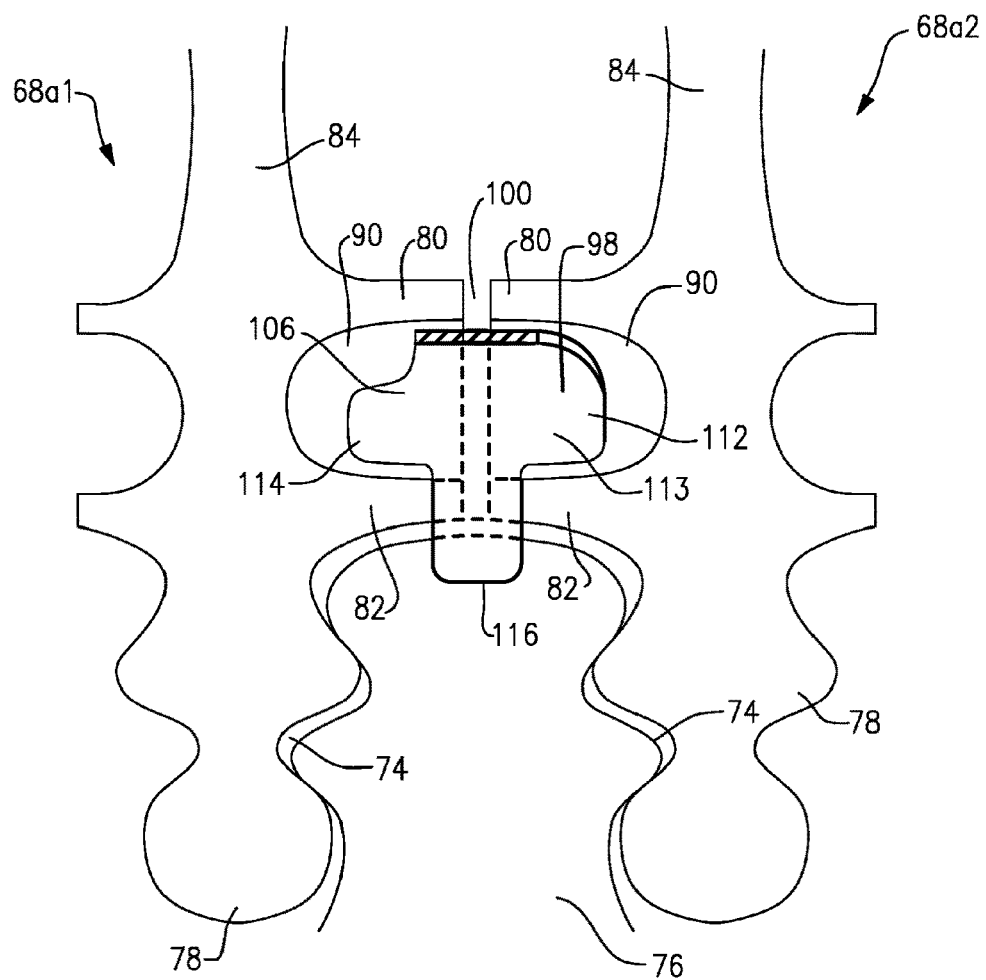
FIG. 8 illustrates a cross-sectional front view along section 8-8 in FIG. 7 of the first example damper seal installed between two turbine blades installed in a turbine disk.
Figure 9:
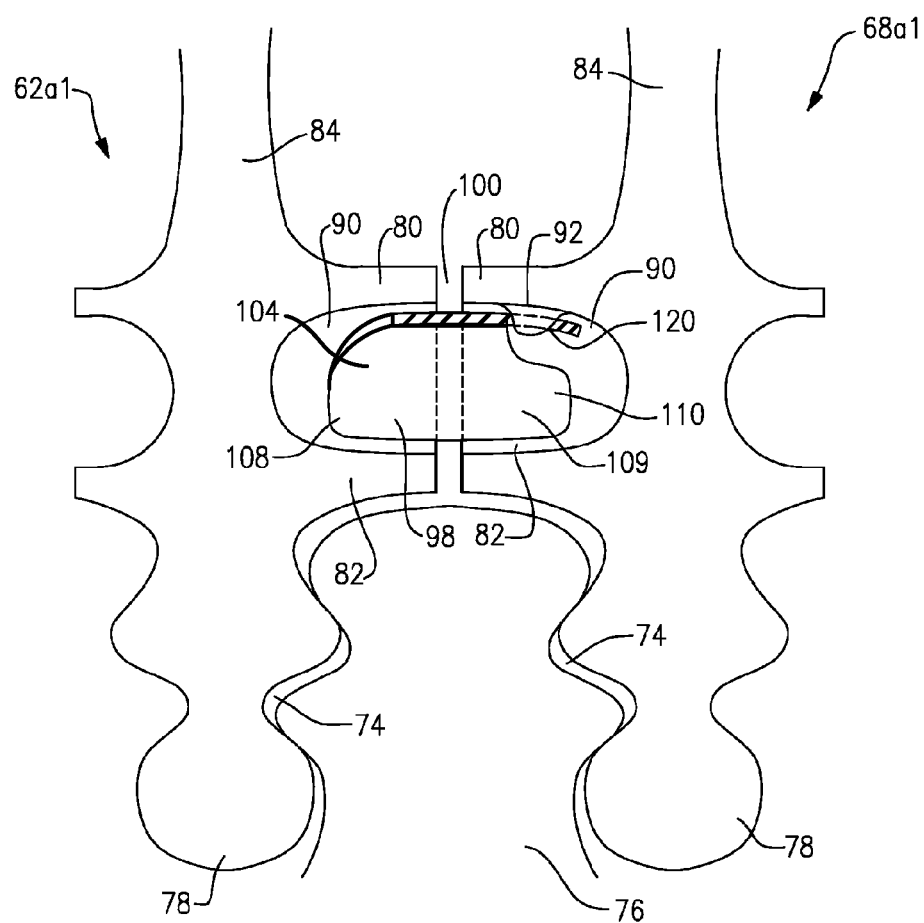
FIG. 9 illustrates a cross-sectional rear view along section 9-9 in FIG. 7 of the first example damper seal installed between two turbine blades installed in a turbine disk.

FIGS. 7 to 9 illustrate the damper seal 98 installed between adjacent turbine blades 68a1 and 68a2. The damper seal 98 is located in the neck cavity 90 of the turbine blades 68a1 and 68a2. The damper seal 98 is located under the platforms 80 and above the retention shelves 82 of the adjacent blades 68a1 and 68a2 and spans the space 100 between the platforms 80 of the turbine blades 68a1 and 68a2. The retention nub 92 of the turbine blade 68a2 is received in the opening 120 of the damper seal 98. The third tab 116 on the second downwardly curved portion 106 of the damper seal 98 (shown in FIG. 8) blocks the space 100 between the adjacent turbine blades 68a1 and 68a2 and provides a seal to prevent the cooling air F from leaking from the neck cavities 90 and into the hot gas flow path E.

Figure 10:
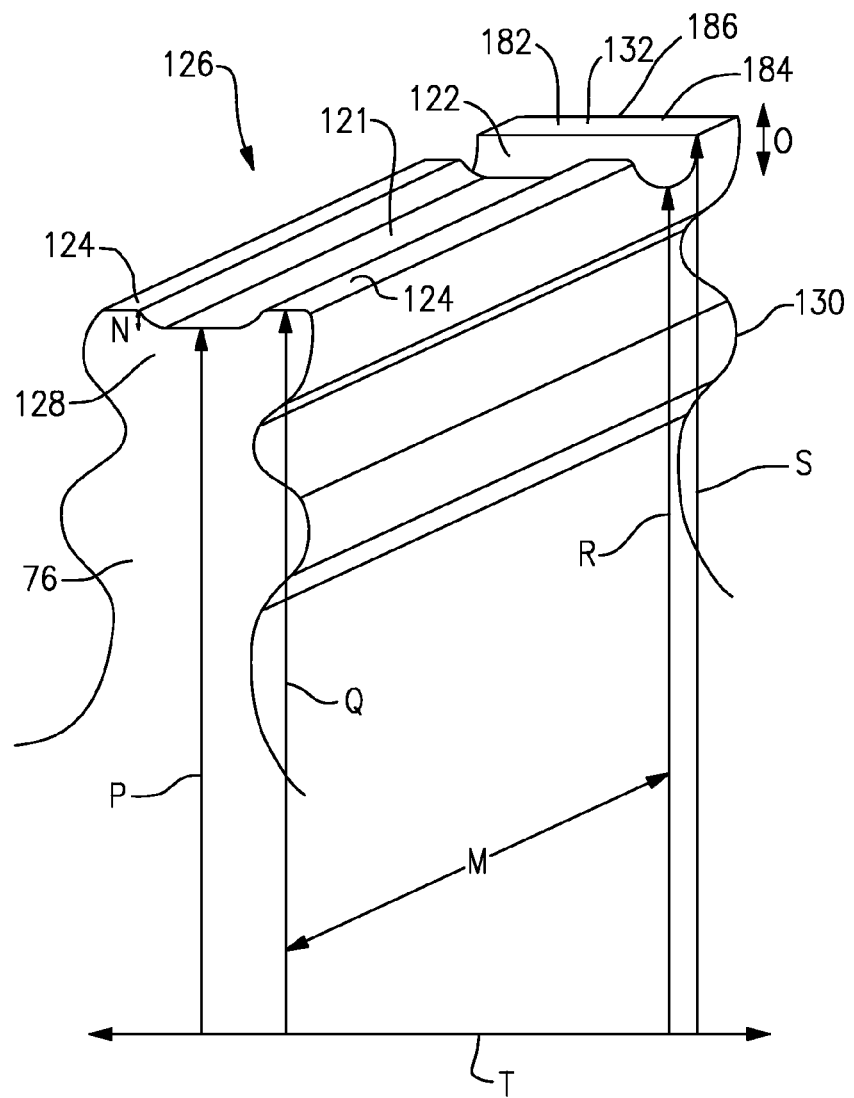
FIG. 10 illustrates an embodiment of a top perspective view of a disk lug of a turbine disk.
Figure 11:
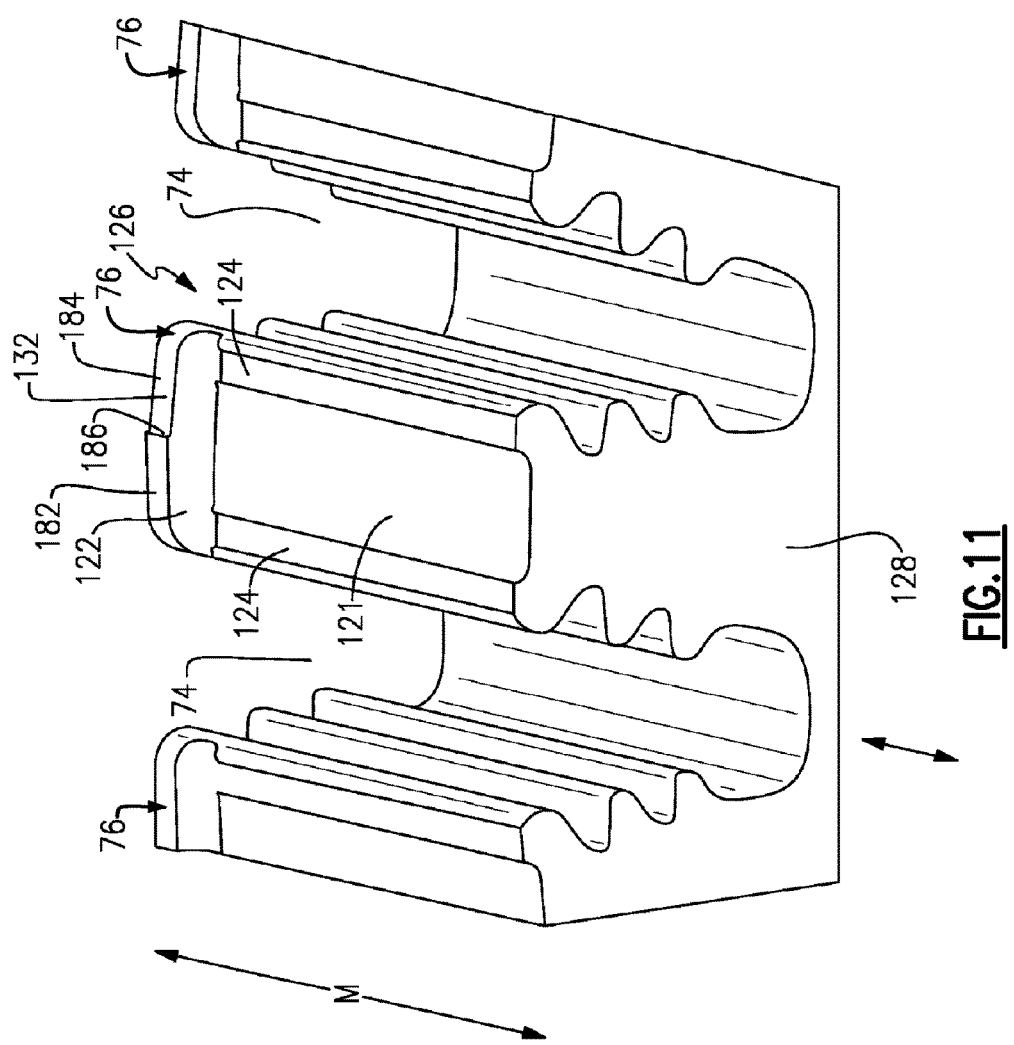
FIG. 11 illustrates another top perspective view of the turbine disk of FIG. 10.

FIGS. 10 and 11 illustrate perspective views of a turbine disk lug 76 located between adjacent turbine disk slots 74 of a turbine disk 61. A first trough 121 and a second trough 122 are formed on an upper surface 126 of the turbine disk lug 76. The first trough 121 has a depth N, and the second trough 122 has a depth O, and the depth N of the first trough 121 is less than a depth O of the second trough 122. The second trough 122 is deeper than the first trough 121 to assist in the formation of the first trough 121. The first trough 121 extends along an axis M of the turbine disk lug 76 (and is substantially parallel to the length L of the turbine blade 68a and the longitudinal axis A).

The first trough 121 is surrounded by two raised surfaces 124. The two raised surfaces 124 are formed by a turning process, and the first trough 121 is formed by a milling process. The second trough 122 is also formed by a turning process.

The first trough 121 extends axially and begins at a first side 128 of the turbine disk lug 76 and terminates in a region near an opposing second side 130 of the turbine disk lug 76. The raised surfaces 124 on opposing sides of the first trough 121 provide balance mass on the upper surface 126 of the turbine disk lug 76 and provide clearance for the damper seal 98. The raised surfaces 124 compensate for any offset of the center of gravity that might occur if the turbine disk 61 is not perfectly round when machined. The first trough 121 also allows for clearance for assembly of the damper seal 98.

The second trough 122 extends circumferentially on the upper surface 126 of the turbine disk lug 76 and is located substantially perpendicularly to the first trough 121 and near the opposing second side 130 of the turbine disc lug 76, defining a leak discouraging tab 132 between the second trough 122 and the opposing second side 130 of the turbine disk lug 76.

The upper surface of the leak discouraging tab 132 includes a first portion 182 and a second portion 184. The first portion 182 inclines upwardly towards a center of the turbine disk lug 76 greater than the second portion 184 inclines, and a ledge 186 is defined at a location where the first portion 182 and the second portion 184 meet.

A bottom surface of the first trough 121 is located a distance P from a central axis T of the turbine disk 61, and the distance P is generally equal to the distance from the center to an outer surface of a turbine disk lug of a conventional turbine rotor. The upper surfaces of the two raised surfaces 124 are located a distance Q from the central axis T of the turbine disk 61. A bottom surface of the second trough 122 is located a distance R from the central axis T of the turbine disk 61. A lowermost portion of the upper surface of the leak discouraging tab 132 is located a distance S from central axis T of the turbine disk 61.

The distance R to the bottom surface of the second trough 122 is less than the distance P to the bottom surface of the first trough 121, and the distance P to the bottom of the first trough 121 is less than the distance Q to the two raised surfaces 124. The distance Q to the upper surfaces of the two raised surfaces 124 is less than the distance S to the lowermost portion of the upper surface of the leak discouraging tab 132. The distance Q to the upper surfaces of the two raised surfaces 124 is less than the distance S to the leak discouraging tab 132, reducing the amount of material of which the turbine disk 61 is formed and also stresses.

Figure 12:
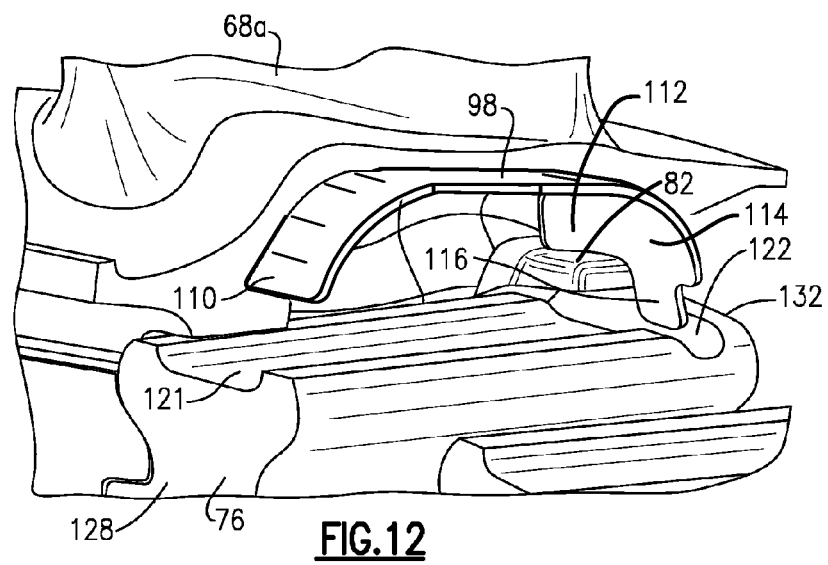
FIG. 12 illustrates a perspective view of the damper seal of FIG. 5 and one turbine blade installed in the a turbine disk slot of the turbine disk of FIG. 10.
Figure 13:
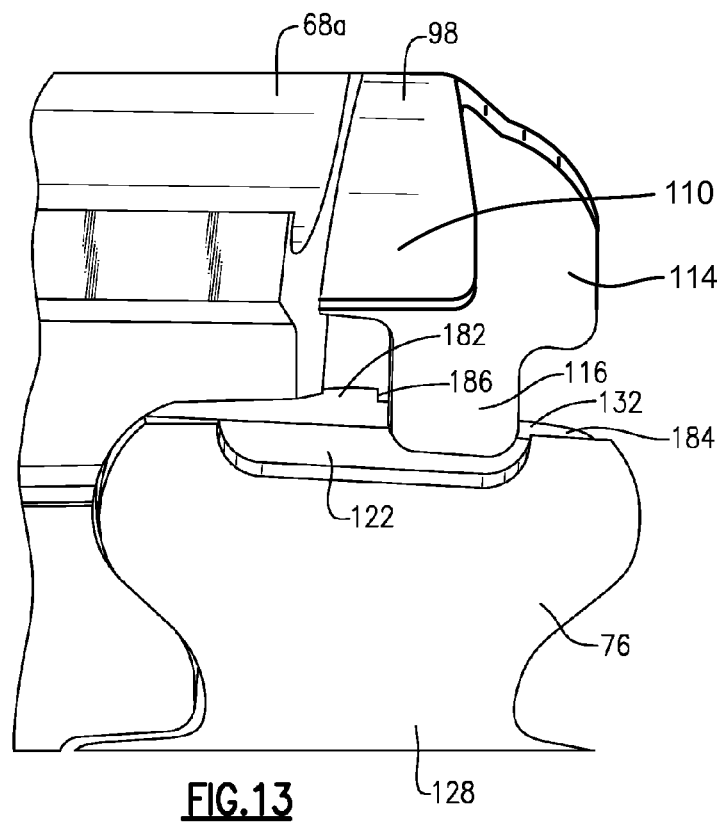
FIG. 13 illustrates a front view of the damper seal of FIG. 5 and one turbine blade installed in the turbine disk slot of the turbine disk of FIG. 10.

FIGS. 12 and 13 illustrate the damper seal 98 installed in a turbine blade 68a received in the turbine disk slot 74. When the turbine blade 68a is installed in the turbine disk 61, the turbine blade 68a is installed from the first side 128 and slid along the axis M. The third tab 116 of the damper seal 98 slides through the first trough 121 of the turbine disk lug 76. The first trough 121 allows the turbine blade 68a to slide into the turbine disk slot 74 in the direction V without interference with the damper seal 98.

The leak discouraging tab 132 acts as a seal to prevent the cooling air F from escaping from the neck cavity 90. The second trough 122 provides clearance for the third tab 116. When the damper seal 98 is installed in the neck cavity 90 of the turbine blade 68a that is installed in the turbine disk slot 74, the third tab 116 of the second downwardly curved portion 106 of the damper seal 98 rests flush on a rear surface 188 of the leak discouraging tab 132 to assist in preventing the leakage of the cooling air F from the neck cavity 90 and into the hot gas flow path E.

In one example, the turbine disk slots 72 are angled approximately 10 degrees relative to a centerline of the turbine disk 61. When a traditional turbine blade is installed in a turbine disk slot, a gap exists between a lower surface of the platform and an upper surface of the turbine disk. In one example, an angle between a blade root and the platform of the turbine disk is 16 degrees. The angle may vary greatly depending on the embodiment.

As shown in FIG. 14, an upper surface 192 of the first portion 182 of the leak discouraging tab 132 has a contour that corresponds to a contour of a lower surface 190 of the platform 80. That is, the upper surface 192 of the first portion 182 of the leak discouraging tab 132 is substantially parallel to the lower surface 190 of the platform 80. The upper surface 192 of the first portion 182 has a greater incline than an upper surface 194 of the second portion 184, and the ledge 186 is defined between the portions 182 and 184. The proximity of the upper surface 192 of the first section 182 and the lower surface 190 of the platform 80 create a seal that prevents the cooling air F from leaking.

Additionally, the damper seal 98 also blocks the passage of the cooling air F through any gap that might exist, for example, a gap between the lower surface 190 of the platform 80 and an upper surface 194 of a portion of the second portion 184 of the leak discouraging tab 132 that is located under the platform 80.

In one example, the damper seal 98 is installed in the turbine blades 68a prior to the installation of the turbine blades 68a into the turbine disk 61. This prevents the damper seal 98 from falling out when the turbine blades 68a are partially installed into the turbine disk 61. Alternately, the damper seal 98 can be installed after the turbine blades 68a are engaged in the turbine disk 61, but not fully installed in the turbine disk 61.

By employing a damper seal 98 that combines the features of a damper and a seal in a single component, the number of parts and the weight is reduced. Additionally, the assembly process is simplified by requiring only one component to be installed between adjacent turbine blades 68a.

Figure 17:
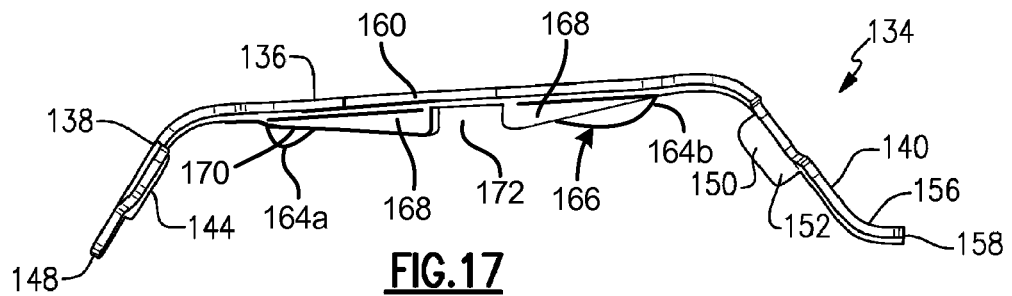
FIG. 17 illustrates a side view of the second example damper seal.
Figure 16:
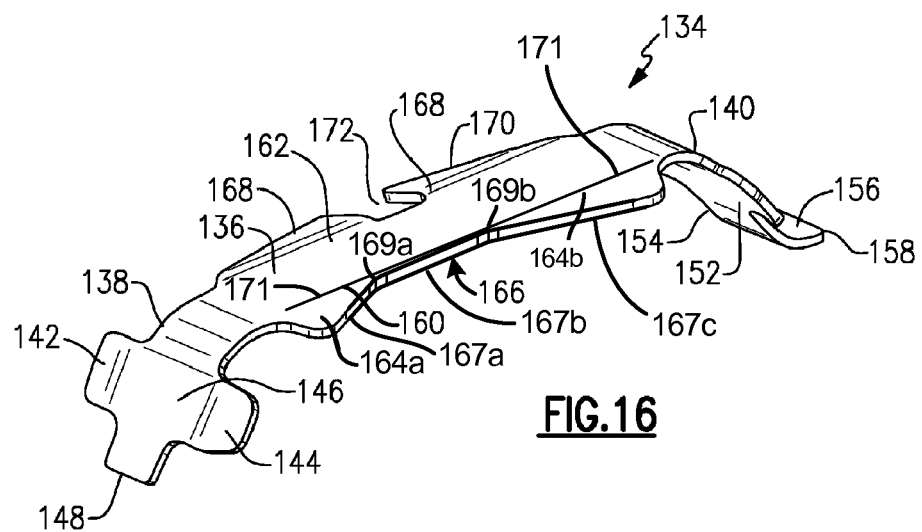
FIG. 16 illustrates a perspective view of the second example damper seal.
Figure 15:
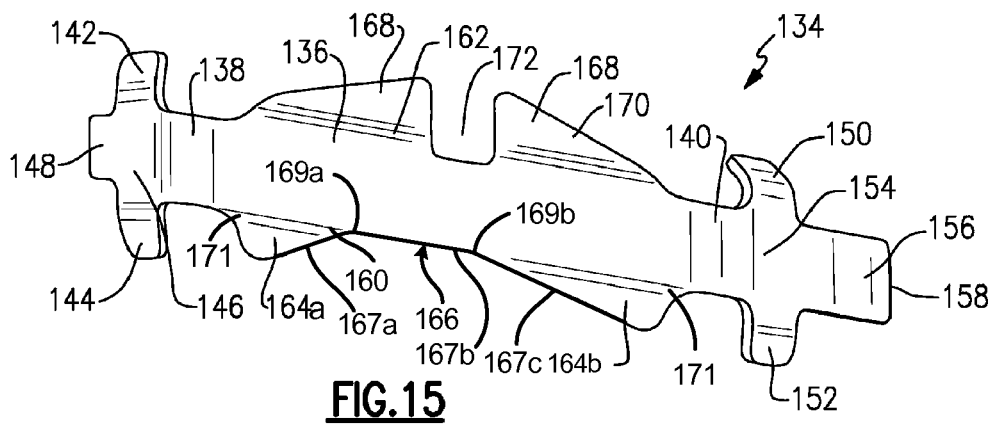
FIG. 15 illustrates an embodiment of a top view of a second example damper seal.

FIGS. 15, 16 and 17 illustrate another example a damper seal 134 employed with a turbine blade 68b employed in the second stage 72 of the high pressure turbine 54. The damper seal 134 spans the space 100 between platforms 80 of adjacent turbine blades 68b to provide sealing and prevent the leakage of cooling air F. The turbine blades 68b of the second stage 72 have a length that is greater than a length of the turbine blades 68a of the first stage 70 as the turbine blades 68b of the second stage 72 extract a different amount of work.

The damper seal 134 imposes a normal load on the turbine blades 68b. The resulting frictional force created by the normal load produces damping, reducing a vibratory response. The damper seal 134 prevents the cooling air F from leaking from the neck cavity 90 of the turbine blades 68b and into the hot gas flow path E along arrows G (shown in FIG. 3).

The damper seal 134 is stamped from sheet metal. The damper seal 134 can also be formed by direct metal laser sintering. Other manufacturing methods are possible. The damper seal 134 is ductile enough to conform to the lower surface 91 of the platform 80 of the turbine blade 68b and provide consistent and complete contact with the turbine blade 68b. The damper seal 134 includes an upper portion 136 that is substantially flat. The damper seal 134 also includes a first projection 138 and a second projection 140 that extend at an angle relative to the upper portion 136 and from opposing end regions of the upper portion 136. In one example, the second projection 140 is longer than the first projection 138.

The first projection 138 includes a first tab 142 and a second tab 144 that extend in opposing directions and substantially perpendicularly to the first projection 138 to define an enlarged portion 146. The enlarged portion 146 provides additional width to the damper seal 134 and prevents rocking of the damper seal 134. A third tab 148 extends substantially perpendicularly to the first tab 142 and the second tab 144 and extends in the general direction of the first projection 138. The third tab 148 is narrower than the enlarged portion 146. The third tab 148 provides sealing and prevents the cooling air F in the neck cavity 90 from leaking and entering the hot gas flow path E when the damper seal 134 is installed in the turbine blade 68b.

The second projection 140 includes a first tab 150 and a second tab 152 that extend in opposing directions and substantially perpendicularly to the second projection 140 to define an enlarged portion 154. The enlarged portion 154 provides additional width and prevents rocking of the damper seal 134. A third tab 156 extends substantially perpendicularly to the first tab 150 and the second tab 152 and extends in the general direction of the second projection 140. The third tab 156 is narrower than the enlarged portion 154. The third tab 156 provides sealing when the damper seal 134 is installed in the turbine blade 68b, and the third tab 156 prevents the cooling air F in the neck cavity 90 from leaking and entering the hot gas flow path E. The third tab 156 also includes a curved end portion 158.

The upper portion 136 of the damper seal 134 includes a first side 160 and an opposing second side 162. Two spaced apart substantially triangular shaped tangs 164a and 164b extend from the first side 160. Together with first side 160, the tangs 164a and 164a define a faceted edge 166. The faceted edge 166 includes face 167a adjacent to face 167b adjacent to face 167c. Each of the faces 167a, 167b and 167c are flat with short curved portions 169a and 169b in between, respectively. The tangs 164a and 164b are bent from the upper portion 136 in the same direction as the first projection 138 and the second projection 140. The tangs 164a and 164b can be either bent once or rolled (i.e. have a compound bend that forms an arc). Regardless of their configuration, the bending line 171 shows where the tangs 164a and 164b are bent away from upper portion 136. The bending line 171 is collinear with face 167b. Such a configuration is beneficial for manufacturing because, while first side 160 is not bent, tangs 164a and 164b are bent independently and can be adjusted independently if necessary. This prevents the potential wrinkling and unevenness that may be present in the damper seal 134 if the tangs 164a and 164b and the first side 160 were all bent together.

Two spaced apart substantially triangular shaped portions 168 extend from the opposing second side 162 of the upper portion 136 and extend at a downward angle relative to the upper portion 136. The two spaced apart substantially triangular shaped portions 168 together define a curved outer surface 170. A rectangular opening 172 is defined between the two spaced apart substantially triangular shaped portions 168. The rectangular opening 172 receives the retention nub 92 of the turbine blade 68b when the damper seal 134 is installed in the turbine blade 68b, preventing misalignment between the damper seal 134 and the turbine blade 68b.

Figure 18:
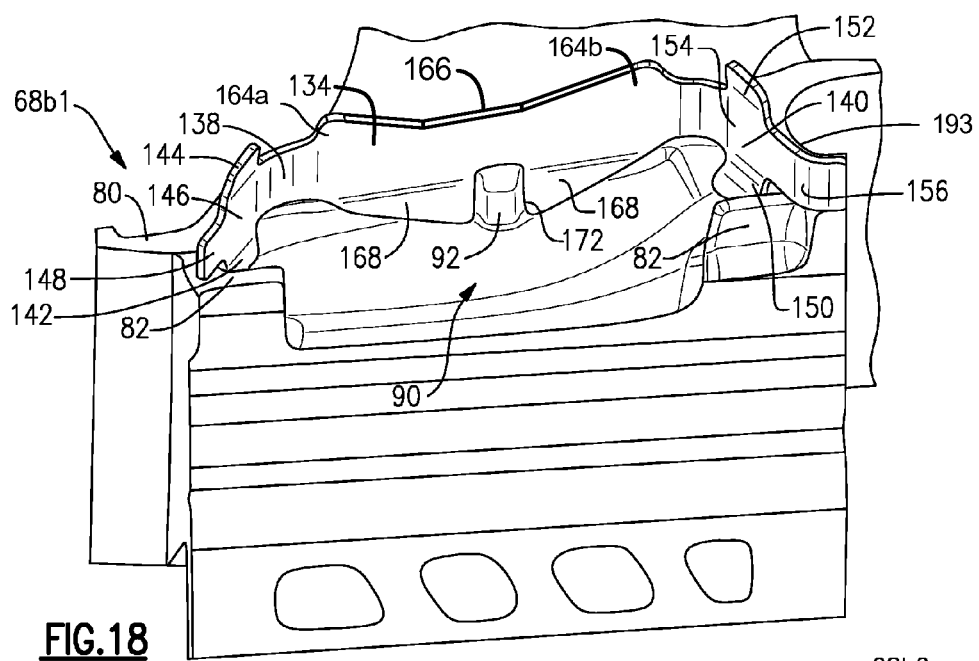
FIG. 18 illustrates a side view of the second example damper seal installed in a turbine blade.

FIG. 18 illustrates a perspective view of the damper seal 134 installed in a neck cavity 90 between two adjacent turbine blades 68b1 and 68b2. The turbine blades 68b1 and 68b2 each include a retention shelf 82 on opposing sides of the platform 80 and a retention nub 92. The retention shelves 82 extend inwardly. The upper portion 136 of the damper seal 134 is located under the platform 80 and adjacent to the lower surface 91 of the platform 80. The retention nub 92 of the turbine blades 68b1 is received in the opening 172 of the damper seal 134. The spaced apart substantially triangular portions 168 on the second side 162 of the upper portion 136 of the damper seal 134 are positioned against the turbine blade 68b1. The enlarged portion 146 of the first projection 138 rests on one retention shelf 82, and the enlarged projection 154 of the second projection 140 rests on another retention shelf 82. The third tab 156 of the second projection 140 curves under the buttress 193. When installed, the contour of the first projection 138 and the second projection 140 corresponds to the contour of the lower surface 91 of the platform 80.

Figure 19:
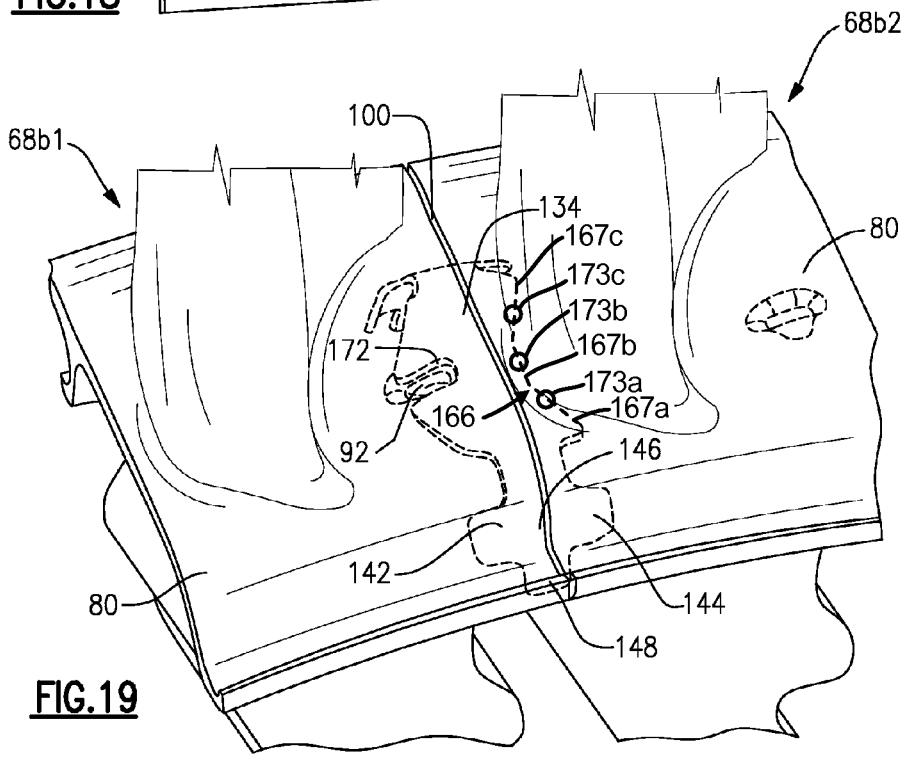
FIG. 19 illustrates a perspective view of the second example damper seal installed between two adjacent turbine blades.

FIG. 19 illustrates a top perspective view of the damper seal 134 installed in adjacent turbine blades 68b1 and 68b2. The damper seal 134 is located in the neck cavity 90 of the turbine blades 68b1 and 68b2. The damper seal 134 is located under the platforms 80 and above the retention shelves 82 of the adjacent turbine blades 68b1 and 68b2 and spans the space 100 between the platforms 40. The retention nub 92 of the platform 80 of the turbine blade 68b1 is received in the opening 172 of the damper seal 68b1. In addition, faceted edge 166 is in contact with turbine blade 68b2 at three contact points 173a, 173b and 173c that correspond to faces 167a, 167b and 167c, respectively.

As explained above with respect to the third tab 116 of the damper seal 98 employed in the first stage 70 of the high pressure turbine 54, the third tabs 148 and 156 of the projections 138 and 140, respectively, of the damper seal 134 prevent the cooling air F from escaping the neck cavity 90 and entering the hot gas flow path E. In the second stage 72 of the high pressure turbine 54, both end regions of the damper seal 134 provide sealing with respect to the flow path of the hot gas E. Therefore, sealing is provided on opposing ends of the turbine blade 68b.

Figure 20:
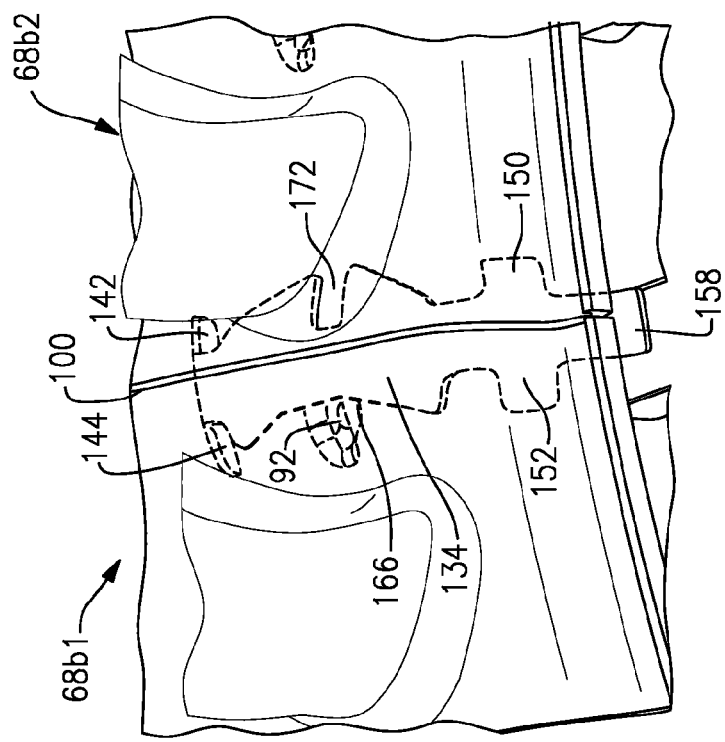
FIG. 20 illustrates a top view of the second example damper seal installed improperly between two adjacent turbine blades in phantom lines.

The damper seal 134 also includes mistake proof features that prevent improper installation of the damper seal 134 with respect to the turbine blades 68b1 and 68b2. FIG. 20 illustrates in phantom lines a damper seal 134 that has been improperly installed in the turbine blades 68b1 and 68b2. When the damper seal 134 is properly installed, the retention nub 92 is received in the opening 172 of the damper seal 134. If the damper seal 134 was installed improperly, the space between the retention nub 92 of one turbine blade 68b1 and the structure of an adjacent turbine blade 68b2 is too small to allow installation of the damper seal 134. FIG. 20 shows an improperly installed damper seal 134 and the overlapping of the damper seal 134 with features of the turbine blades 68b1 and 68b2 in phantom lines.

Figure 21:
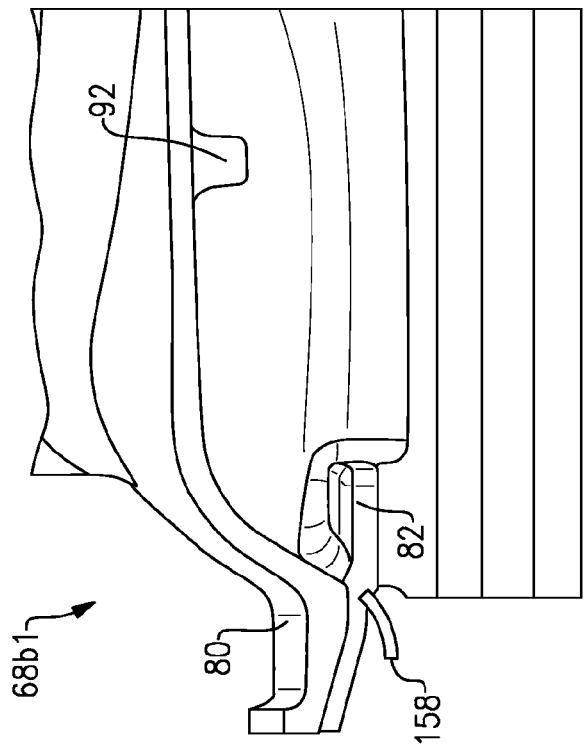
FIG. 21 illustrates a side view of the second example damper seal installed improperly in a turbine blade.

Additionally, as shown in FIG. 21, a visual indication is provided if the damper seal 134 is improperly installed as the curved end portion 158 of the third tab 156 would be visible.

The retention shelves 82 assist in retaining the damper seal 134 in the neck cavity 90. The damper seal 134 is free to slide in a direction substantially perpendicular to the length of the platform 80 to dampen vibrations and provide frictional damping, but the engagement of the retention nub 92 in the opening 172 of the damper seal 134 and the restraint provided by the retention shelves 82 prevent movement of the damper seal 134 in a direction substantially parallel to the length of the platform 80.

The damper seal 134 is installed in the neck cavities 90 of the turbine blades 68b prior to installation of the turbine blades 68b into the turbine disk 61. This prevents the damper seal 134 from falling out when the turbine blades 68b are partially installed into the turbine disk 61. Alternately, the damper seal 134 can be installed after the turbine blades 68b are engaged in the turbine disk 61, but not fully installed in the turbine disk 61.

Discussion of Possible Embodiments

The following are non-exclusive descriptions of possible embodiments of the present invention.

A damper seal received in a cavity of a turbine blade, according to an exemplary embodiment of this disclosure, among other possible things, includes: a central body portion having a first end region, an opposing second end region, a first side region, an opposing second side region, and a width; a first portion extending from the first end region of the central body portion; a second portion extending from the opposing second end region of the central body portion; and a projection extending from the first side region that defines an opening that is configured to receive a lug of the turbine blade to align the damper seal relative to the turbine blade; wherein the second side region includes a faceted edge.

The damper seal of the preceding paragraph can optionally include, additionally and/or alternatively, any one or more of the following features, configurations and/or additional components:

A further embodiment of the foregoing damper seal, wherein a first end region of the first portion can include first outwardly extending tabs that define a first enlarged portion that has a first width greater than the width of the central body portion, and wherein a second end region of the second portion can include second outwardly extending tabs that define a second enlarged portion that has a second width greater than the width of the central body portion.

A further embodiment of any of the foregoing damper seals, wherein the first portion can include another tab that extends substantially perpendicularly to the first outwardly extending tabs.

A further embodiment of any of the foregoing damper seals, wherein the second portion can include another tab that extends substantially perpendicularly to the second outwardly extending tabs.

A further embodiment of any of the foregoing damper seals, wherein the damper seal can be formed from stamped sheet metal.

A further embodiment of any of the foregoing damper seals, wherein the damper seal can be located between a platform and a retention shelf and the first enlarged portion can rest on the retention shelf of the turbine blade.

A further embodiment of any of the foregoing damper seals, wherein a portion of the damper seal can engage a groove in a turbine disk lug of a turbine disk.

A further embodiment of any of the foregoing damper seals, wherein the second side region can include a first tang and a second tang that extend from the central body portion.

A further embodiment of any of the foregoing damper seals, the first tang and the second tang can be bent from the central body portion.

A further embodiment of any of the foregoing damper seals, wherein the faceted edge can have a first face adjacent to a second face adjacent to a third face.

A further embodiment of any of the foregoing damper seals, wherein the first tang and the second tang can be bent along a line that is collinear with the second face.

A turbine blade according to an exemplary embodiment of this disclosure, among other possible things, includes: a root received in a slot of a turbine disk; a blade; a platform located between the root and the blade having a lower surface; and a damper seal is located adjacent the lower surface of the platform, the damper seal including a central body portion having a first end region, an opposing second end region, a first side region, an opposing second side region, a width, a first portion extending generally downward from the first end region of the central body portion, a second portion extending generally downward from the opposing second end region of the central body portion, and a projection extending from the first side region that defines an opening that is configured to receive a lug of the turbine blade to align the damper seal relative to the turbine blade, wherein the second side region includes a faceted edge.

The turbine blade of the preceding paragraph can optionally include, additionally and/or alternatively, any one or more of the following features, configurations and/or additional components:

A further embodiment of the foregoing turbine blade, wherein a first end region of the first portion can include first outwardly extending tabs that define a first enlarged portion that has a first width greater than the width of the central body portion, and wherein a second end region of the second portion can include second outwardly extending tabs that define a second enlarged portion that has a second width greater than the width of the central body portion.

A further embodiment of any of the foregoing turbine blades, wherein the first portion can include another tab that extends substantially perpendicularly to the first outwardly extending tabs.

A further embodiment of any of the foregoing turbine blades, wherein the second portion can include another tab that extends substantially perpendicularly to the second outwardly extending tabs.

A further embodiment of any of the foregoing turbine blades, wherein the damper seal can be formed from stamped sheet metal.

A further embodiment of any of the foregoing turbine blades, wherein the platform can further comprise: a retention shelf; and a cavity that is defined between a lower surface of the platform and the retention shelf; wherein the damper seal can be received in the cavity; and wherein the first enlarged portion can rest on the retention shelf of the turbine blade.

A further embodiment of any of the foregoing turbine blades, wherein a portion of a damper seal can engage a groove in a turbine disk lug of the turbine disk.

A further embodiment of any of the foregoing turbine blades, wherein the faceted edge can have a first face adjacent to a second face adjacent to a third face.

A further embodiment of any of the foregoing turbine blades, wherein the second side region can include a first tang and a second tang that extend and are bent downward from the central portion along a line that is collinear with the second face.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A damper seal received in a cavity of a turbine blade, the damper seal comprising:
    a central body portion having a first longitudinal end region, an opposing second longitudinal end region, a first side region, an opposing second side region;
    a first portion extending from the first side region at the first longitudinal end region of the central body portion, the first portion defining a first tang, the first tang including a first edge that extends linearly back towards the central body portion in the direction of the second longitudinal end region;
    a second portion extending from the first side region at the opposing second longitudinal end region of the central body portion, the second portion defining a second tang, the second tang including a second edge that extends linearly back towards the central body portion in the direction of the first longitudinal end region; and
    a third portion extending from the second side region that defines an opening that is configured to receive a lug of the turbine blade to align the damper seal relative to the turbine blade;
    wherein the first side region includes a faceted edge that includes the first edge on the first portion, the second edge on the second portion, and a linear edge on the central body between the first edge and the second edge, whereby the faceted edge defines a first flat face adjacent to a second flat face adjacent to a third flat face.

2. The damper seal as recited in claim 1 wherein a first longitudinal end region of the first portion includes first outwardly extending tabs that define a first enlarged portion that has a first width greater than a width of the central body portion, and wherein a second longitudinal end region of the second portion includes second outwardly extending tabs that define a second enlarged portion that has a second width greater than the width of the central body portion.

3. The damper seal as recited in claim 2 wherein the first portion includes another tab that extends perpendicularly to the first outwardly extending tabs.

4. The damper seal as recited in claim 2 wherein the second portion includes another tab that extends perpendicularly to the second outwardly extending tabs.

5. The damper seal as recited in claim 2 wherein the damper seal is located between a platform and a retention shelf of the turbine blade, and the first enlarged portion rests on the retention shelf of the turbine blade.

6. The damper seal as recited in claim 1 wherein the damper seal is formed from stamped sheet metal.

7. The damper seal as recited in claim 1 wherein a portion of the damper seal engages a groove in a turbine disk lug of a turbine disk.

8. The damper seal as recited in claim 1 wherein the first tang and the second tang are bent from the central body portion.

9. The damper seal as recited in claim 8 wherein the first tang and the second tang are bent along a line that is collinear with the linear edge.

10. A turbine blade comprising:
    a root received in a slot of a turbine disk; a blade; a platform located between the root and the blade having a lower surface; and
    a damper seal is located adjacent the lower surface of the platform, the damper seal including:

a central body portion having a first longitudinal end region, an opposing second longitudinal end region, a first side region, an opposing second side region;

a first portion extending generally downward from the first side region at the first longitudinal end region of the central body portion, the first portion defining a first tang, the first tang including a first edge that extends linearly back towards the central body portion in the direction of the second longitudinal end region;

a second portion extending generally downward from the opposing second longitudinal end region of the central body portion, the second portion defining a second tang, the second tang including a second edge that extends linearly back towards the central body portion in the direction of the first longitudinal end region; and a third portion extending from the second side region that defines an opening that is configured to receive a lug of the turbine blade to align the damper seal relative to the turbine blade;

wherein the first side region includes a faceted edge that includes the first edge on the first portion, the second edge on the second portion, and a linear edge on the central body between the first edge and the second edge, whereby the faceted edge defines a first flat face adjacent to a second flat face adjacent to a third flat face.

11. The turbine blade as recited in claim 10 wherein a first longitudinal end region of the first portion includes first outwardly extending tabs that define a first enlarged portion that has a first width greater than a width of the central body portion, and wherein a second longitudinal end region of the second portion includes second outwardly extending tabs that define a second enlarged portion that has a second width greater than the width of the central body portion.

12. The turbine blade as recited in claim 11 wherein the second portion includes another tab that extends perpendicularly to the second outwardly extending tabs.

13. The turbine blade as recited in claim 10 wherein the first portion includes another tab that extends perpendicularly to the first outwardly extending tabs.

14. The turbine blade as recited in claim 10 wherein the damper seal is formed from stamped sheet metal.

15. The turbine blade as recited in claim 10 wherein the platform further comprises:
 a retention shelf; and
 a cavity that is defined between a lower surface of the platform and the retention shelf;
 wherein the damper seal is received in the cavity; and
 wherein the first enlarged portion rests on the retention shelf of the turbine blade.

16. The turbine blade as recited in claim 10 wherein a portion of a damper seal engages a groove in a turbine disk lug of the turbine disk.

17. The turbine blade as recited in claim 10 wherein the first tang and the second tang are bent downward from the central portion along a line that is collinear with the linear edge.

* * * * *